United States Patent [19]
Moore et al.

[11] 3,757,887
[45] Sept. 11, 1973

[54] VEHICLE GUIDANCE SYSTEM

[75] Inventors: Wilcy I. Moore, Folsom, Pa.; Gerard L. Lafond, Cinnaminson, N.J.

[73] Assignee: Versadyne Inc., Prospect Park, Pa.

[22] Filed: July 9, 1971

[21] Appl. No.: 161,078

[52] U.S. Cl.................................. 180/98, 318/587
[51] Int. Cl............................................. B60k 27/06
[58] Field of Search...................... 180/98, 79.1, 79; 318/580, 587

[56] References Cited
UNITED STATES PATENTS

| | | | |
|---|---|---|---|
| 3,009,525 | 11/1961 | DeLiban | 180/98 |
| 2,990,902 | 7/1961 | Cataldo | 180/79.1 X |
| 3,612,206 | 10/1971 | Ohntrup | 180/98 |
| 3,338,328 | 8/1967 | Cataldo | 180/79.1 |
| 3,132,710 | 5/1964 | Petrella et al. | 180/98 X |
| 3,614,990 | 10/1971 | Schnitzler | 180/79.1 X |
| 3,653,456 | 4/1972 | Uemura | 180/98 |

*Primary Examiner*—Kenneth H. Betts
*Assistant Examiner*—John P. Silverstrim
*Attorney*—Woodcock, Washburn, Kurtz & Mackiewicz

[57] ABSTRACT

A system for guiding a vehicle on a surface along a predetermined path defined by at least one wire coupled to an oscillator for generating an electromagnetic field. A field sensor carried by the vehicle including pick-up coils having mutually orthogonal axes lying in a plane substantially parallel to the plane of the track senses the horizontal components of the field. Signals induced in the pick-up coils are then utilized by a deviation computer in the vehicle to determine the angle and distance of deviation from the track. A steering control which responds to the deviation adjusts the steering mechanism of the vehicle to minimize the deviation.

15 Claims, 6 Drawing Figures

VEHICLE GUIDANCE SYSTEM

BACKGROUND OF THE INVENTION

This invention relates to systems for guiding a vehicle on a surface along a predetermined path.

More particularly, this invention relates to the vehicle guidance system having a track including at least one wire carrying a field generating current where the wire substantially coincides with the predetermined path. In such a system, field sensing means such as pick-up coils are carried by the vehicle with the field inducing signals indicative of the vehicle deviation from the predetermined path. Through the use of suitable servo means, corrective steering measures are taken to minimize the deviation and bring the vehicle back to the predetermined path.

PRIOR ART

In vehicle ground guidance systems, both a single as well as a pair of track wires have been utilized. U.S. Pat. No. 2,990,902 — Cataldo discloses a system of the single wire type and utilizes a pair of vehicle mounted coils for sensing deviation from a path coincident with the guidance wire. As disclosed in this patent, the coils are inclined with respect to a plane parallel to the single track wire.

A single wire vehicle guidance system is also disclosed in U.S. Pat. No. 3,009,525 — De Liban wherein three mutually orthogonal sensing coils are mounted on the vehicle utilized. In the De Liban system, the lateral displacement from the single wire track is determined by sensing a vertical field. Such an arrangement is particularly unsatisfactory in an aircraft due to the presence of a highly conductive horizontal surface in the form of the aircraft skin which adversely effects any sensing of the vertical field near the skin of the aircraft. The determination of lateral displacement in the De Liban system is undesirably affected by the vehicle angle with respect to the track rather than being independent of the vehicle angle. Furthermore, this system does not sense a vehicle angle but rather the steering angle of the vehicle.

U.S. Pat. No. 3,132,710 - Petrella et al. discloses a vehicle ground guidance system having a pair of track wires carrying signals of opposite phase. The deviation of the vehicle from a path defined by the track wires is sensed by a pair of coils, one horizontal and one vertical. Because one of the coils is vertical, the coils must be located on the nose wheel of any aircraft utilizing the system in order to minimize the effect of the aircraft skin on the vertical components of the field generated by the track wires. However, the mounting of the coils on the nose wheel is undesirable in that it creates substantial problems because of the abuse the coils take at this location.

The system of the Petrella patent does not determine and therefore does not rely upon critical information such as the angle between the predetermined path and the aircraft longitudinal axis or the nose wheel direction. It is not therefore capable of determining the correct nose wheel angle independnet of the instantaneous nose wheel angle and position of the aircraft with respect to the path. Furthermore, it is not capable of optimizing the corrective approach angle of the aircraft to the proper path which is a function of the maximum allowable aircraft velocity.

SUMMARY OF THE INVENTION

In accordance with one aspect of the invention, a vehicle guidance system of the track wire type is provided which relies exclusively on the horizontal components of the track field. This aspect of the invention involves the use of a pair of pick-up coils having mutually orthogonal axes parallel to the track surface which sense the horizontal components of the fields. The pick-up coils may then be mounted adjacent the skin of a vehicle such as an aircraft without detrimentally affecting the sensed horizontal components of the fields. Furthermore, the pick-up coils are not subjected to the abuse which is characteristic of a nose wheel mounting position.

In accordance with another aspect of the invention, the correct steered path is determined independently of the instantaneous steered path and the position of the vehicle with respect to the predetermined path. This aspect of the invention is provided by a deviation computer which solves the equation $\theta_a + \theta_p = \phi$ where $\phi$ represents the angle between the instantaneous steered path of the steering wheel and the longitudinal axis of the vehicle. $\theta_a$ represents the angle between the predetermined path and the steered path and the angle $\theta_p$ represents the angle between the predetermined path and the longitudinal axis of the vehicle. The angle $\phi$ is determined by a steering control means and applied to the input to the deviation computer for solution of the steering equation. Both the angle $\theta_a$ and $\theta_p$ are determined from the signals induced in the pair of pick-up coils. The output of the deviation computer represents angular deviation in the form of an error signal which is applied to the steering control means to correct the steered path.

In accordance with still another aspect of the invention, steering corrections are made at an optimum angle. This aspect of the invention is provided by the deviation computer which determines the angle $\theta_a$ from the expression $|K_1 D|^{1/2} - |K_2 \dot{D}|$ where $D$ represents the distance between the steering wheel means and the predetermined path, $K_1 = 8 \dot{\phi}_m/V_m$ and $K_2 = -1/V_m$ where $\dot{\phi}_m$ is the maximum turning rate of the steering wheel means and $V_m$ is the maximum velocity of the vehicle.

In accordance with another aspect of the invention, the signal is generated indicating a certain threshold distance has not been exceeded. In an embodiment of the invention utilizing a single track wire, an additional pick-up coil having an axis perpendicular to the longitudinal axis of the vehicle is provided. Utilizing the signals induced in the additional pick-up coil and one of the pair of pick-up coils perpendicular to the longitudinal axis of the vehicle, a field gradient is determined by the deviation computer which is utilized in generating the position indicating signal. The field gradient is also utilized for normalization purposes in computing the angles $\theta_a$ and $\theta_p$. In a two track wire embodiment of the invention, the pick-up coil having an axis transverse to the longitudinal axis of the vehicle provides a signal to the deviation computer for determining the position of the vehicle with respect to the predetermined path.

In accordance with another aspect of the invention, the lateral displacement of the vehicle from the track is independent of the vehicle angle. This is true for both the single wire track system and the two track wire system.

These and other aspects of the invention are more fully explained in the following specification which refers to the accompanying drawings.

DETAILED DESCRIPTION OF PREFERRED EMBODIMENTS

Figure 1:
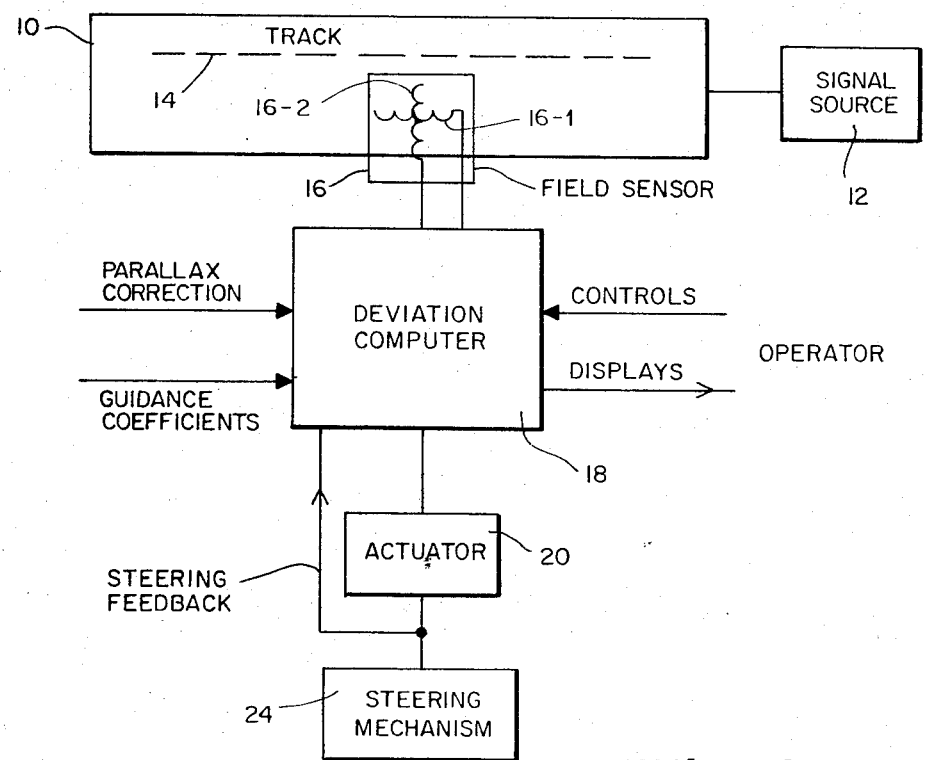
FIG. 1 is a partially schematic block diagram of the basic elements in a system embodying the invention.

The basic elements of a system embodying various aspects of the invention and capable of guiding a vehicle along a predetermined path or track will now be described with reference to FIG. 1. As shown, the track 10 which may comprise one or more wires or cables is coupled to and supplied by a signal source 12 and defines a predetermined path axis of travel 14 for a vehicle under the control of the guidance system. The horizontal components of the field generated by the signal source 12 and the wires of the track 10 are sensed by a field sensing means 16 including a pair of pick-up coils 16–1 and 2 having mutually orthogonal axes with the axis of one of the coils being parallel to the longitudinal axis of the vehicle carrying the pick-up coils 16. The signals which are induced in the pick-up coils are then applied to a deviation computer 18 which is also carried by the vehicle for determining both the angular deviation of the vehicle from the path 14 as well as the displacement or position of deviation from the path 14.

In addition to input in the form of signals induced in the coils 16, the deviation computer 18 also receives a number of additional inputs as well as providing two outputs. Parallax correction which will be described in somewhat further detail is provided in order to correct for the difference in displacement of the pick-up coils from the path 14 as compared with the displacement of the steering wheel(s) from the path 14. Guidance coefficients such as $V_m$ and $\phi_m$ are also input to the deviation computer 18 for purposes of optimizing the corrective steered path.

The output of deviation computer 18 in the form of a deviation or error signal is applied to a guided steering control means 20 which comprises suitable servo means. The output of the guidance steering control 20 which represents the angle of the steering wheel(s) in then applied as a feedback signal to the deviation computer 18.

The output of an actuator 20 is connected to a steering mechanism 24 which may include a steering wheel. A clutch may be provided to disconnect the output of the actuator from the steering mechanism 24.

In the foregoing discussion, the term vehicle has been utilized as a generic term for any apparatus which is intended to be steered in a predetermined path across a surface. As such, the term vehicle is intended to embrace an aircraft taxiing along the ground. Since the invention has particular utility in a taxi guidance system for aircraft, such systems will now be described in substantial detail and reference will now be made to FIG. 2 for purposes of explaining the nomenclature associated with an aircraft taxi guidance system.

Figure 2:
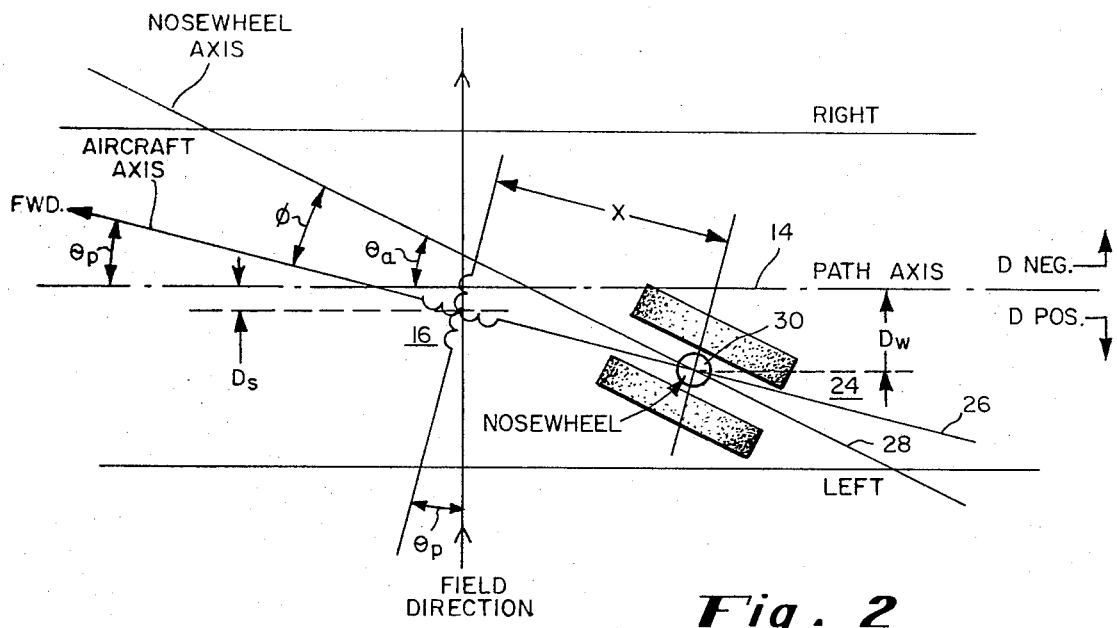
FIG. 2 provides a graphical explanation of the guidance nomenclature utilized in describing the invention.

As shown in FIG. 2, the steering mechanism 24 comprises a steering nose wheel(s) of an aircraft having a longitudinal axis parallel to one of the pick-up coils 16–1 and orthogonal to the other pick-up coil 16–2. A number of angles, all of which are computed by the deviation computer 18 of FIG. 1, are defined by the angles between the longitudinal axis 26 of the aircraft, the predetermined path 14, and the nose wheel axis or the instantaneous steered path 28. The angle $\phi$ represents the angle between the longitudinal axis 26 and the nose wheel axis 28. The angle $\theta_a$ represents the angle between the nose wheel axis 28 and the longitudinal path axis 14. Finally, the angle $\theta_p$ represents the angle between the longitudinal axis 26 and the predetermined path axis 14.

Another important variable which is determined by the deviation computer 18 is the distance $D$ which represents displacement or position deviation from the predetermined path axis 14. This displacement or position deviation is designated as $D_s$ when referring to the position of the pick-up coils 16. The displacement or position deviation is designated $D_w$ when referring to the position of a wheel strut 30 in the steering mechanism 24. For displacement or position deviation to the right of the predetermined path axis 14, the values of $D$, both $D_s$ and $D_w$, are positive. For displacement or position deviation to the left of the predetermined path axis 14, the values of $D_s$ and $D_w$ are negative. Although the difference of $D_s$ and $D_w$ may seem rather small, the difference does become quite significant for large values of $X$ which represents the distance between the point of intersection for the coils 16–1 and 2 and the strut 30. Large values of $X$ and values $\theta_p$ unequal to zero will lead to some parallax error and accordingly, the value of $X$ becomes significant in parallax correction as will be subsequently described.

A two wire track embodiment of the invention for an aircraft taxi system will now be described with reference to FIGS. 3 and 4. Describing first the ground track sub-system shown in FIG. 3, the signal source 12 comprises an oscillator 32 generating a signal $F_1$ having a characteristic frequency $f_1$ which may be of the order 500 Hz and a frequency multiplier 34 for obtaining a signal $F_2$ having a characteristic frequency $f_2$ which may be of the order of 1,000 Hz. The signals $F_1$ and $F_2$ are summed at a summing amplifier 36 to obtain a signal $I_R = I_1 \sin\omega_1 t + I_2 \sin\omega_2 t$ where $\omega_1 = 2\pi f_1$ and $\omega_2 = 2\pi f_2$. This signal is then amplified in a power amplifier 38 and applied to the right wire or track leg 40 of the two wire track. The same signals are also applied to a differential amplifier 42, amplified at a power amplifier 44, and applied as $I_L = I_1 \sin\omega_1 t - I_2 \sin\omega_2 t$ to the left wire or track leg 46. A shielded wire 48 completes the circuit for the wires 40 and 46.

The signal $f_1$ generates a relatively constant level field, while the field signal from $f_2$ generates a ramp.

Figure 3:
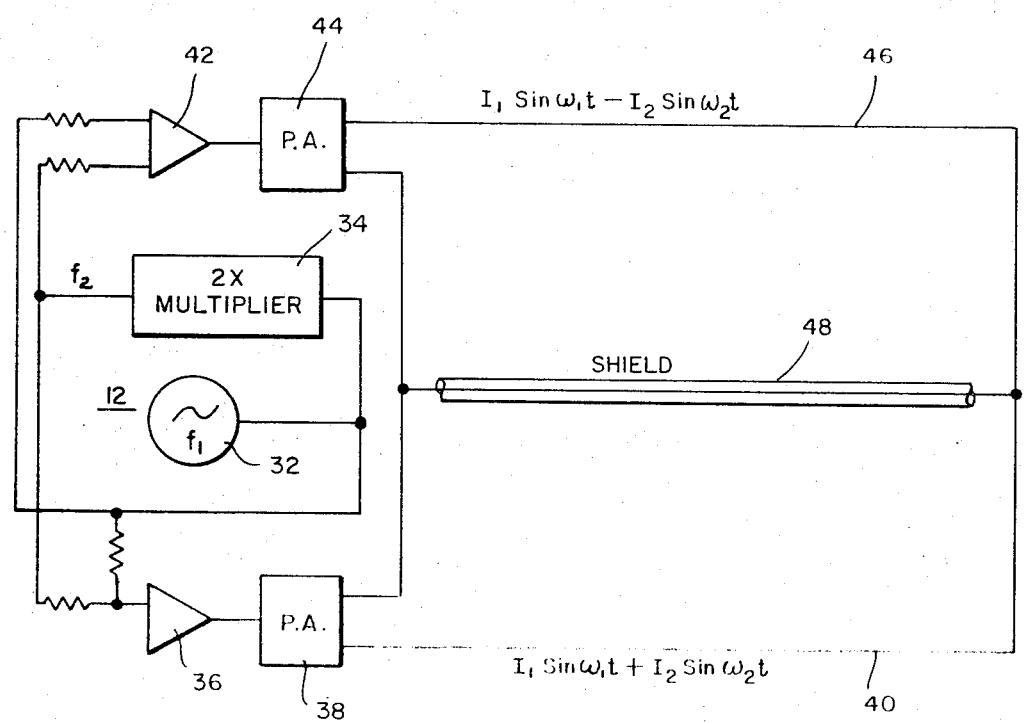
FIG. 3 is a schematic diagram of the ground track subsystem in one embodiment of the invention.
Figure 4:
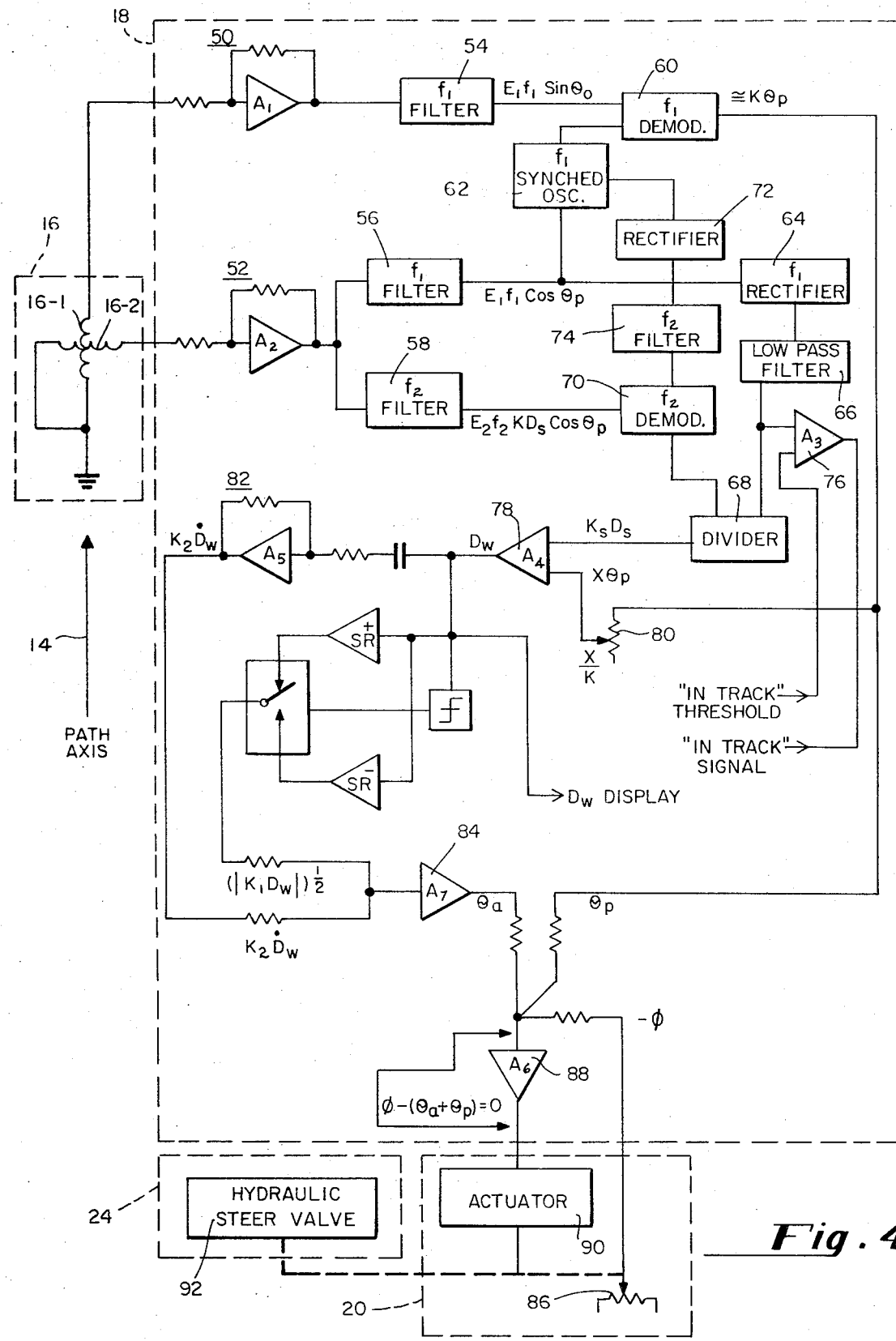
FIG. 4 is a schematic diagram of the vehicle subsystem in the embodiment of FIG. 3.

The horizontal field components, which are generated by the subsystem of FIG. 3, are sensed and operated upon by the vehicle subsystem shown in FIG. 4. The subsystem comprises the field sensor 16, the deviation computer 18, the guided steering control means 20, and the steering mechanism 24.

As shown, the field sensor 16 comprises the coils 16–1 and 2. Since the pick-up coil 16–1 intersects the predetermined path axis 14 at an angle $\theta_p$, a signal including an $EF_1 \sin \theta_p$ component is induced in coil 16–1 while a signal including a component $E_1F_1\cos\theta_p + E_2F_2Kds \cos \theta_p$ is induced in the coil 16–2. The signals which are induced in the coils 16–1 and 2 by the field are now applied to the deviation computer 18.

After amplification by amplifiers 50 and 52, the signals are applied to filters 54, 56, and 58. The filter 54 which is coupled to the output of the amplifier 50, passes the component having the characteristic frequency $f_1$ while blocking the components having the characteristic frequency $f_2$ to obtain an output $E_1F_1 \sin \theta_p$. The filters 56 and 58 which are parallel and coupled to the output of the amplifier 52 only pass frequencies $f_1$ and $f_2$ respectively so as to obtain two separate output signals $E_1F_1 \cos \theta_p$ and $E_2F_2KDs \cos \theta_p$.

The signal $E_1F_1 \sin \theta_p$ is now demodulated at a demodulator 60 which is coupled to a synchronized oscillator 62 having a characteristic frequency $f_1$ to obtain a signal representing the $K \sin \theta_p$ where $K$ is a constant. Since $\theta_p$ is usually a small angle, the $\sin \theta_p$ is a very good approximation of the angle $\theta_p$ so that the output of the demodulator 60 provides a signal which is a very close approximation of the quantity $K\theta_p$.

The signal representing $E_1F_1 \cos \theta_p$ is rectified at a rectifier 64 and applied to a low pass filter 66 to produce the signal $E_1 \cos \theta_p$ at the input to a divider 68. The signal representing the signal $E_2F_2 KDs \cos \theta_p$ is demodulated at a demodulator 70 using the second harmonic of $f_1$ generated by the oscillator 62 after rectification at a rectifier 72 and filtering at a filter 74 passing the frequency $f_2$. After demodulation, a signal representing $E_2 KDs \cos \theta_p$ is applied as another input to the divider 68.

Since the signal representing $E_1F_1 \cos \theta_p$ will not go to zero under normal guidance conditions, the signal may be utilized to synchronize the oscillator 62. Similarly, the signal representing $E_1 \cos \theta_p$ may also be used as an input to an amplifier 76 along with an "in track" threshold signal. Amplifier 76 compares the $E_1 \cos \theta_p$ signal with the "in track" threshold signal to generate an "in track" signal for display in the cockpit of the aircraft.

The $E_2 KDs \cos \theta_p$ signal and the $E_1 \cos \theta_p$ signal are divided at the divider 68 to produce a signal representing $(E_2KDs \cos \theta_p)/(E_1 \cos \theta_p) = E_2KDs/E_1 = K_s D_s$. It will be noted that division by the function $\cos \theta_p$ eliminates the effect of vehicle angle on the determination of vehicle displacement $D_s$. After obtaining the $K_s D_s$ signal from the divider 68, the signal is subtracted from an $X\theta_p$ signal at a differential amplifier 78 to obtain an output signal represnting $D_w$. The $X\theta_p$ signal is obtained from the tap of a potentiometer 80 which is connected across the signal $K\theta_p$. By appropriately setting the potentiometer 80 so as to correspond to the value $X/K$, the signal $X\theta_p$ is obtained. The $D_w$ signal is then modified by boundary coefficient $K_1$ to obtain the quantity value $|K_1D_w|^{1/2}$ while the quantity $K_2\dot{D}_w$ is obtained from a derivative amplifier circuit 82. Subtraction of the $K_2\dot{D}_w$ signal from the $|K_1D_w|^{1/2}$ is performed at an amplifier 84 to obtain the angle $\theta_a$.

Having now determined signals representing $\theta_a$ and the angle $\theta_p$ and utilizing a signal representing the $\phi$ obtained from a slide wire 86 of the steering control means 20, the deviation computer 18 solves the steering equation $\phi = \theta_a + \theta_p$ or $\theta_a + \theta_p - \phi = 0$ in the following manner. The signals $\theta_a$, $\theta_p$, and $-\phi$ are applied as inputs to a summing amplifier 88 which generates a deviation or error signal representing the deviation or error from the predetermined path axis 14. Upon application of the deviation signal to a servo actuator 90 of the steering control means 20, the servo actuator drives an hydraulic steering valve 92 of the steering control means 24 associated with the aircraft nose-wheel to steer the aircraft back on to the path axis 14. In addition, the servo actuator 90 controls the tap on the slide wire 86 so as to continuously generate the signal $-\theta$ in the form of a feedback signal.

The expression $\theta_a = |K_1 D_w|^{1/2} - K_2 \dot{D}_w$ has been relied upon in the foregoing. It has been found to represent a conservative and convenient expression for the computation of $\theta_a$ where $K_2 = d\theta_{am}/d\dot{D}_w = (-2D_w\dot{\phi}_m)/\dot{D}_w^2 = -\theta_{am}^2/2D_w\dot{\phi}_m = -1/V_m$ and $\theta_{am}$ is the maximum or steepest approach angle which may be expressed as $\theta_{am} = \sqrt{2D_w\dot{\phi}_m}/V$, where $\dot{\phi}_m$ equals maximum nose wheel turning rate in radians per second, $V$ equals aircraft velocity in feet per second, and $V_m$ is the maximum for the velocity $V$.

Parallax correction is performed by the amplifier 78 mentioned previously. In this connection, it will be noted that the parallax correction is performed in accordance with the expression $D_w = D_s + X\sin \theta_p$. Of course the value $X\theta_p$ may be approximated by the expression $\sin X\theta_p$ for small angles of $\theta_p$. Accordingly, to a very good approximation, $D_w = D_s + X\theta_p$.

In the embodiment described in the foregoing, a two wire track is utilized, each wire lying on either side of the predetermined path axis 14. As mentioned previously, the two-wire system requires a constant level field. In the embodiment now to be described with reference to FIG. 5 and 6, a single wire track is utilized with the single wire parallel with the path axis 14. This system does not require a constant level field.

Figure 5:
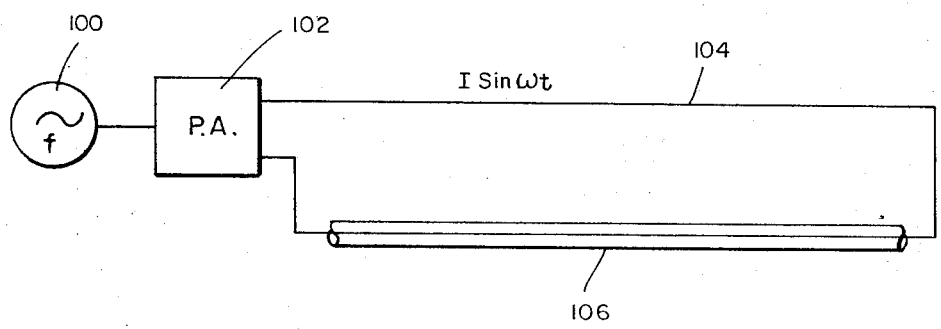
FIG. 5 is a schematic diagram of a ground track subsystem in another embodiment of the invention.
Figure 6:
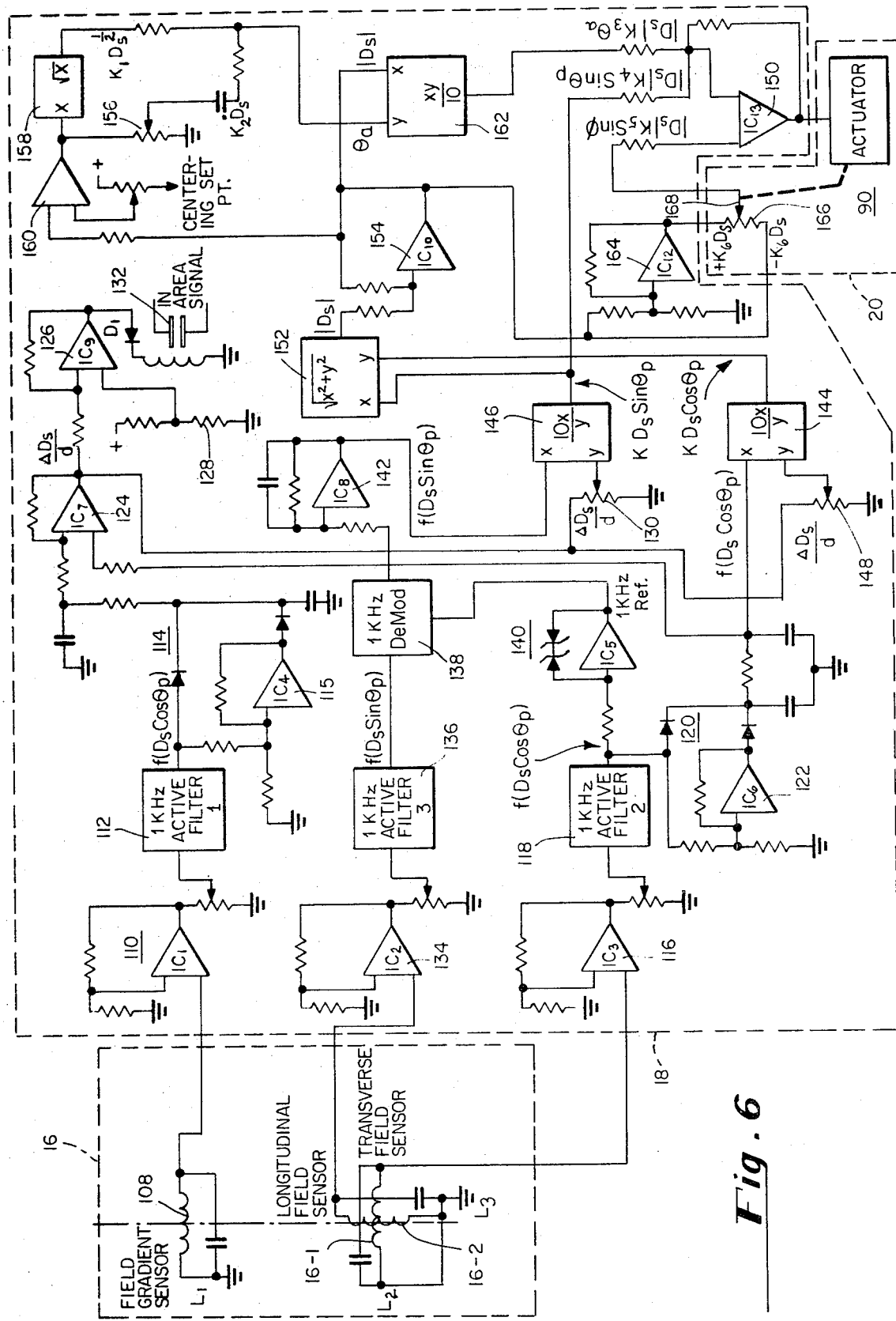
FIG. 6 is a schematic diagram of the vehicle subsystem in the embodiment of FIG. 5.

As shown in FIG. 5, the ground track sub-system comprises a single oscillator means 100 generating a signal $F=I \sin wt$ where $w=2\P f$ and $f$ may equal 1,000 Hz. The signal from the oscillator 100 is applied to the power amplifier 102 and coupled to a single wire track 104. The circuit is completed through a shielded wire 106.

As in the case of a two wire sub-system, the pick-up coils 16–1 and 16–2 are utilized to sense the horizontal components of the field generated by the wire 104 as shown in FIG. 5. In addition, a field gradient sensing coil 108 is utilized in the vehicle sub-system. The horizontal field components which are sensed by the coil 108 induce a signal including a component $F(D_s \cos \theta_p)$ which is applied to an amplifier 110, an active filter 112, and an AC to DC converter 114 including an amplifier 115 forming part of a ¶ network filter to obtain a signal $D_s \cos \theta_p$. Similarly, the signal including a component $F(D_s \cos \theta_p)$ induced in the coil 16–1 is applied to an amplifier 116, an active filter 118, and an AC to DC converter including an amplifier 122 forming part of a ¶ network 114 to obtain a signal $D_s \cos \theta_p$.

The output of the converters 114 and 120 are applied to a differential amplifier 124 to obtain a signal representing the field gradient between the pick-up coils 16–1 and 108 expressed as $\Delta D_s/d$ where $d$ is the separation distance (center to center) between the pick-up coil 108 and the pick-up coil 16–1 and $D_s$ is the separation distance between the coils 16–1 and the single wire 104 which is parallel with the predetermined path axis 14. By comparing the output of the amplifier 124 with a predetermined threshold voltage at an amplifier 126, the threshold voltage being provided by a tap on a potentiometer 128, an "in area" signal is obtained. The "in area" signal may then be utilized to activate the automatic guidance system through a switch (electronic or otherwise). With this arrangement, the automatic guidance system will maintain control only within the following limits: $|D_s \cos \theta_p(108)| \pm |D_s \cos \theta_p(16-1)| > e$.

The signal including a component $F(D_s \sin \theta_p)$ induced in the pick-up coil 16-2 is amplified by an amplifier 134, filtered by an active filter 136 and then demodulated by a phase demodulator 138. The signal $F(D_s \sin \theta_p)$ has a phase characteristic which depends on which quadrant the angle $\theta_p$ is in. The direction and magnitude of this angle is detected by the phase demodulator 138 whose reference signal phase is $F(D_s \cos \theta_p)$ and amplified at an amplifier 140. The signal $F(D_s \sin \theta_p)$ is then applied to a low pass filter 142.

Both the output signal $F(D_s \cos \theta_p)$ of the converter 120 and the output signal $F(D_s \sin \theta_p)$ of the low pass filter 142 are now applied to dividers 144 and 146 respectively along with a field gradient signal for purposes of linearization. Although the field is relatively linear in a two wire guidance track under certain constraints of path width versus coil height, the field is relatively non-linear in a one wire guidance track system. This non-linear characteristic can be minimized by normalizing the value of $D_s$ for a given operating domain by dividing the $F(D_s)$ by the field gradient. This division is performed by a dividers 144 and 146 in combination with potentiometers 148 and 150 having the field gradient signal $\Delta D_s/d$ coupled thereto. After linearization, the signal $KD_s \sin \theta_p$ is obtained at the output of the divider 146. Similarly, a signal $KD_s \cos \theta_p$ is obtained at the output of the divider 144.

The output of the divider 146 provides the signal which may be utilized in the approximation of $\theta_p$ for solution of the steering equation at a differential amplifier 150. However, the angle $\theta_a$ must be obtained by first determining the value of $D_s$. The value of $D_s$ is derived from the two linearized signals $KD_s \sin \theta_p$ and $KD_s \cos \theta_p$ by the use of a vector operator module 152 having an output function equal to the square root of $X^2 + Y^2$ so as to operate upon the $KD_s \sin \theta_p$ and $KD_s \cos \theta_p$ signals in the following manner: $\sqrt{(D_s \sin \theta_p)^2 + (D_s \cos \theta_p)^2} = |D_s|$. $\theta_a$ may now be computed from $|D_s|$. Note that the determination of $D_s$ is independent of the vehicle angle $\theta_p$.

The $|D_s|$ signal is first applied to a buffer amplifier 154. An RC rate adjust network 156 is provided to obtain the signal representing $|K_2 \dot{D}_s|$ while a square root module 158 is provided to obtain a signal representing $|K_1 D_s|^{1/2}$. After subtraction is performed at an amplifier 160, a signal representing $\theta_a$ is obtained and applied to a multiplier 162 along with the $|D_s|$ signal. Note that a potentiometer 168 has been provided in the circuitry of the summing amplifier 160. This potentiometer provides a centering set point which determines the tracking path of the pick-up coils 16-1 with respect to the single wire 104.

The $D_s$ signal is also applied to an inverter 164 having an output providing a power supply for a slide wire 166. By controlling the position of the tap of the slide wire 168 in response to the position of the servo actuator 90,
a feedback signal representing the nose wheel angle or steered path $\phi$ is obtained for purposes of solving the steering equation $(\theta_a + \theta_p) - \phi = 0$. The signals representing $\theta_a$, $\theta_p$, and $\phi$ are now applied to the differential amplifier 150 to obtain an error or deviation signal which serves as the input to the steering control means 20.

The deviation computer in the foregoing specification has been described in analog form. It will be appreciated by those of ordinary skill in the art that a special purpose digital computer which operates in real time might be utilized to determine the necessary quantities for solving the steering equation. Other modifications may also occur to those of ordinary skill in the art. The appended claims are intended to cover such modifications which fall within the spirit and scope of the invention.

What is claimed:

1. In a system for guiding a vehicle having a steering means along a predetermined path on a surface, wherein an angle $\theta_a$ represents the angle between the predetermined path and the path steered by said steering means, an angle $\theta_p$ represents the angle between the predetermined path and a longitudinal axis of the vehicle, and an angle $\phi$ represents the angle between the steered path and the longitudinal axis of the vehicle, said system comprising:

a track means for generating a field along said predetermined path, said track means being fixed with respect to said surface;

a pick-up means carried by said vehicle for sensing said field;

a deviation computer means carried by said vehicle for solving a steering equation $\phi = \theta_a + \theta_p$ comprising means for determining the angles $\theta_a$ and $\theta_p$ in response to said sensed field and means for determining the difference between the angle $\phi$ and the sum of the angles $\theta_a$ and $\theta_p$; and a steering control means carried by said vehicle for controlling said steering means in response to said difference in a manner tending to reduce said difference.

2. The system of claim 1 wherein said means for determining the angle $\theta_a$ comprises:

a means for determining $(K_1 D)^{1/2}$ in response to said sensed field where $D$ is the distance between said steering means and said predetermined path and $K_1$ is a constant;

a means for determining $(|K_2 \dot{D}|)$ in response to said sensed field where $K_2$ is a constant; and a means for determining the difference between $(|K_1 D|)^{1/2}$ and $(K_2 \dot{D})$, said difference approximating $\theta_a$.

3. The system of claim 2 wherein, $K_1 = 8 \ \dot{\phi}_m/V_m$ and $K_2 = -1/V_m$ where $\dot{\phi}_m$ is the maximum turning rate of the steering means and $V_m$ is the maximum velocity of the vehicle.

4. The system of claim 3 whwerein said means for determining the angle $\theta_p$ determines the sin $\theta_p$ as an approximation of the angle $\theta_p$.

5. The system of claim 1 wherein said sensing means comprises a pair of pick-up coils having mutually orthogonal axes lying in a plane parallel to said surface, one of said pick-up coils having an axis parallel to the longitudinal axis of said vehicle.

6. The system of claim 5 wherein said track means comprises at least one wire extending along said predetermined path and at least one oscillator means coupled to said at least one wire.

7. The system of claim 6 wherein said track means comprises a single wire and a single oscillator and said sensing means further comprises another pick-up coil having an axis perpendicular to the longitudinal axis of the vehicle and a means for determining the field gradient $\Delta D_s/d$ between said other pick-up coil and the longitudinal axis of the vehicle, where $d$ is the separation distance between said other pick-up coil and said one of said pair of said coils having an axis parallel to the longitudinal axis of the vehicle and $D_s$ is the distance separating said one of said pair of coils and said single wire so as to indicate the distance of the vehicle from said single wire.

8. The system of claim 7 wherein said deviation computer means includes:
   a means for normalizing the value of $D_s$ by dividing a signal representing a function of $D_s$ by said field gradient $\Delta D_s/d$.

9. The system of claim 8 wherein said deviation computer means includes means for generating an "in area" signal from said field gradient.

10. A vehicle guidance system comprising:
   at least one reference signal generating means;
   at least one track wire defining a predetermined path of travel for said vehicle over a surface, said reference signal generating means being coupled to said track wire to generate an electromagnetic field along said predetermined path;
   a pair of pick-up coils mounted on said vehicle, said coils having mutually orthogonal axes lying in a plane substantially parallel to said surface for sensing said electromagnetic field;
   deviation determining means coupled to both said coils and responsive to the electromagnetic field sensed thereby for determining the angular deviation of said vehicle from said predetermined path and the lateral displacement from said predetermined path independent of the instantaneous steering angle of said vehicle with respect to said predetermined path; and
   steering means responsive to the output of said deviation determining means.

11. The vehicle guidance system of claim 10 including feedback means coupled between said steering means and said deviation determining means.

12. The vehicle guidance system of claim 11 wherein said deviation determining means comprises a means for determining the angle $\theta_a$ representing the angle between the predetermined path and the steered path of the steering means, a means for determining the angle $\theta_p$ representing the angle between the predetermined path and the longitudinal axis of said vehicle, and a means for determining the angle $\phi$ representing the angle between the steered path of said steering means and longitudinal axis of the vehicle, said steering control means controlling said steering means in a manner tending to maintain equality between the angle $\phi$ and the sum of the angle $\theta_a$ and $\theta_p$.

13. The taxi guidance system of claim 12 wherein said system includes a pair of track wires defining said predetermined path of travel, said reference signal generating means coupled to said pair of track wires, one of said pair of track wires carrying a signal representing the sum of two sinusoidal functions of different frequencies provided by said signal generating means and the other of said track wires carrying a signal representing the difference of said two sinusoidal functions as provided by said signal generating means.

14. The taxi guidance system of claim 12 comprising a single track wire carrying a signal representing a sinusoidal function of a single frequency generated by said generating means.

15. The taxi guidance system of claim 12 wherein said deviation determining means includes a means of determining the angle $\theta_p$ without a constant level field.

* * * * *